(12) United States Patent
Tamaizumi et al.

(10) Patent No.: US 9,290,200 B2
(45) Date of Patent: Mar. 22, 2016

(54) VEHICLE POWER STEERING SYSTEM

(71) Applicant: JTEKT CORPORATION, Osaka-shi, Osaka (JP)

(72) Inventors: Terutaka Tamaizumi, Okazaki (JP); Hirozumi Eki, Okazaki (JP); Masayuki Kita, Okazaki (JP); Isao Namikawa, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/455,407

(22) Filed: Aug. 8, 2014

(65) Prior Publication Data

US 2015/0057889 A1    Feb. 26, 2015

(30) Foreign Application Priority Data

Aug. 26, 2013   (JP) .................................. 2013-174698

(51) Int. Cl.

| | |
|---|---|
| B62D 5/00 | (2006.01) |
| B62D 6/00 | (2006.01) |
| B62D 15/00 | (2006.01) |
| B62D 5/04 | (2006.01) |
| B62D 15/02 | (2006.01) |
| B62D 1/28 | (2006.01) |

(52) U.S. Cl.
CPC .............. *B62D 5/0472* (2013.01); *B62D 1/286* (2013.01); *B62D 5/0463* (2013.01); *B62D 15/025* (2013.01)

(58) Field of Classification Search
USPC .......................................................... 701/41
See application file for complete search history.

(56) References Cited

U.S. PATENT DOCUMENTS

| | | | | |
|---|---|---|---|---|
| 2005/0236896 | A1* | 10/2005 | Offerle et al. ................. | 303/146 |
| 2006/0162989 | A1* | 7/2006 | Yamada ........................ | 180/444 |
| 2007/0021889 | A1 | 1/2007 | Tsuchiya | |
| 2008/0208407 | A1 | 8/2008 | Tanaka et al. | |
| 2009/0024278 | A1* | 1/2009 | Kondo et al. ................... | 701/41 |
| 2012/0197493 | A1* | 8/2012 | Fujimoto et al. ............... | 701/41 |
| 2013/0311044 | A1* | 11/2013 | Tamaizumi et al. ........... | 701/42 |

FOREIGN PATENT DOCUMENTS

| | | |
|---|---|---|
| EP | 2 172 386 A1 | 4/2010 |
| JP | B2-4453012 | 4/2010 |
| JP | 2013-078999 A | 5/2013 |

OTHER PUBLICATIONS

Apr. 13, 2015 Extended Search Report issued in European Patent Application No. 14181954.0.

* cited by examiner

*Primary Examiner* — Yonel Beaulieu
(74) *Attorney, Agent, or Firm* — Oliff PLC (57) ABSTRACT

In the vehicle power steering system, a first assist torque component is computed based on a steering torque and a vehicle speed. A target steered angle is computed based on the first assist torque component and the steering torque, and a second assist torque component is set based on the target steered angle and an actual steered angle. Then, the vehicle power steering system assists a steering operation by applying an assist torque Tas corresponding to the first assist torque component and the second assist torque component. Further, an ideal steered angle at which a vehicle is able to keep travelling in a lane is set based on image information on the lane captured by a camera, and a correction value is computed based on the deviation between the ideal steered angle and the actual steered angle. Then, the target steered angle is corrected by the correction value.

9 Claims, 7 Drawing Sheets

VEHICLE POWER STEERING SYSTEM

INCORPORATION BY REFERENCE

The disclosure of Japanese Patent Application No. 2013-174698 filed on Aug. 26, 2013 including the specification, drawings and abstract, is incorporated herein by reference in its entirety.

BACKGROUND OF THE INVENTION

1. Field of the Invention

The invention relates to a vehicle power steering system that assists a driver's steering operation.

2. Description of the Related Art

There is a power steering system that assists a driver's steering operation by applying torque generated by an electric motor to a steering mechanism of a vehicle. A conventional power steering system of this type is described in Japanese Patent No. 4453012.

The power steering system includes a torque sensor that detects a steering torque applied by a driver, and a steering angle sensor that detects a steered angle of steered wheels. The power steering system sets a first assist torque component, which is a basic component of an assist torque, on the basis of the steering torque detected by the torque sensor. An ideal model that outputs an ideal target steered angle corresponding to the steering torque is provided in advance in the power steering system.

The power steering system sets a target steered angle from the steering torque detected by the torque sensor, on the basis of the ideal model, and obtains a second assist torque component that should be applied to the steering mechanism in order to maintain an actual steered angle detected by the steering angle sensor at the target steered angle. The power steering system assists a steering operation by executing assist control for applying the assist torque based on the first assist torque component and the second assist torque component from the electric motor to the steering mechanism. With such a configuration, even when some kind of disturbance is input into the steering mechanism, the steered angle is maintained at a target value. Thus, vibrations of the steering mechanism due to the disturbance are reliably suppressed. As a result, the driver's steering feel is improved.

Some vehicle power steering systems execute so-called lane keeping control for assisting a driver's steering operation by changing the assist torque that is applied to the steering mechanism such that the vehicle easily keeps travelling in a lane. If such lane keeping control is executed by the power steering system described in Japanese Patent No. 4453012, it is necessary to execute both the assist control and the lane keeping control with the use of the electric motor. Therefore, there is a possibility that the assist control and the lane keeping control will interfere with each other and the steering feel that is supposed to be obtained by the assist control will deteriorate.

Such a possibility may arise not only in the lane keeping control but also in a case where the power steering system described in Japanese Patent No. 4453012 executes control of setting an ideal steered angle on the basis of the travelling state of the vehicle and assisting a steering operation such that the actual steered angle coincides with the ideal steered angle, such as intelligent parking control for assisting a driver's steering operation during parking.

SUMMARY OF THE INVENTION

One object of the invention is to provide a vehicle power steering system with which a driver's steering feel is improved.

A vehicle power steering system according to an aspect of the invention includes an assist torque computing unit configured to:

i) set a first assist torque component based on a steering torque applied to a steering mechanism during a steering operation of a vehicle;

ii) compute a target steered angle of steered wheels of the vehicle based on the steering torque;

iii) set a second assist torque component to be applied to the steering mechanism to maintain an actual steered angle of the steered wheels at the target steered angle;

iv) set an assist torque corresponding to the first assist torque component and the second assist torque component;

v) set an ideal steered angle based on a travelling state of the vehicle;

vi) compute a correction value based on a deviation between the ideal steered angle and the actual steered angle; and vii) correct the target steered angle based on the correction value.

The vehicle power steering system assists the steering operation by applying the assist torque from an electric motor to the steering mechanism.

According to the above aspect, when there is a deviation between the ideal steered angle set based on the travelling state of the vehicle and the actual steered angle, the target steered angle is corrected by the correction value based on the deviation, and the second assist torque component is computed based on the corrected target steered angle and the actual steered angle. Thus, the second assist torque component contains an assist torque component corresponding to the correction value, in other words, an assist torque component that brings the actual steered angle closer to the ideal steered angle. Hence, the driver's steering operation is assisted so that the actual steered angle is brought closer to the ideal steered angle, by applying the assist torque containing the second assist torque component to the steering mechanism. Due to the configuration in which the target steered angle is corrected by the correction value, the target steered angle is offset just by the correction value, and it is thus possible to maintain the control in which the ideal target steered angle corresponding to the steering torque is calculated on the basis of the ideal model and the actual steered angle is brought closer to the target steered angle. Thus, desired properties are imparted to the steering feel obtained by applying the assist torque containing the second assist torque component to the steering mechanism, that is, the steering feel obtained by the assist control. Hence, the driver's steering feel is improved.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to FIG. 1 to FIG. 6. First, the outline of a vehicle power steering system according to a first embodiment of the invention will be described.

Figure 1:
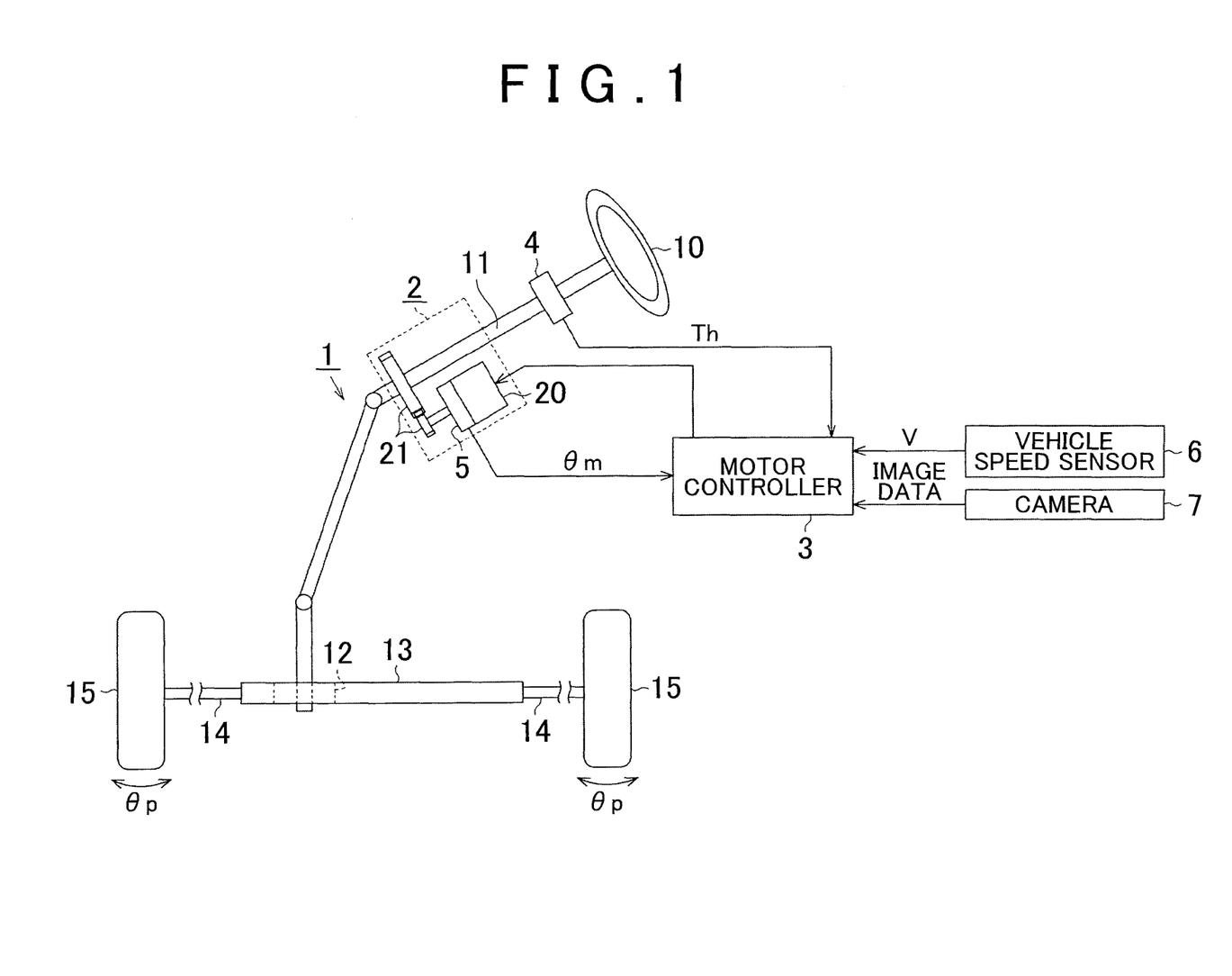
FIG. 1 is a block diagram schematically illustrating the configuration of a vehicle power steering system according to an embodiment of the invention.

As illustrated in FIG. 1, the power steering system includes a steering mechanism 1 that steers steered wheels 15 in response to a driver's operation of a steering wheel 10, and an assist mechanism 2 that assists the driver's steering operation.

The steering mechanism 1 includes a steering shaft 11 that serves as a rotary shaft of the steering wheel 10. A rack shaft 13 is connected to the lower end of the steering shaft 11 via a rack-and-pinion mechanism 12. In the steering mechanism 1, when the steering shaft 11 is rotated in response to a driver's steering operation, the rotation of the steering shaft 11 is converted into a reciprocating linear motion of the rack shaft 13 in its axial direction by the rack-and-pinion mechanism 12. The reciprocating linear motion of the rack shaft 13 is transmitted to the steered wheels 15 via tie rods 14 connected to respective ends of the rack shaft 13, so that an actual steered angle θp of the steered wheels 15 is changed and the travelling direction of a vehicle is changed accordingly.

The assist mechanism 2 includes an electric motor 20 that applies assist torque to the steering shaft 11. The electric motor 20 is a three-phase alternating-current motor. The rotation of the electric motor 20 is transmitted to the steering shaft 11 via a reduction gear 21, so that motor torque is applied to the steering shaft 11 to assist a steering operation.

The power steering system is provided with various sensors that detect an operation quantity of the steering wheel 10 and a state quantity of the vehicle. For example, the steering shaft 11 is provided with a torque sensor 4 that detects a torque (steering torque) Th that is applied to the steering shaft 11 in response to a driver's steering operation. The electric motor 20 is provided with a rotation angle sensor 5 that detects a rotation angle θm of the electric motor 20. The vehicle is provided with a vehicle speed sensor 6 that detects a travelling speed of the vehicle (hereinafter, referred to as "vehicle speed V"), and a camera 7 that captures an image of the area ahead of the vehicle. The outputs from the sensors are input into a motor controller 3. The motor controller 3 controls the electric motor 20 on the basis of the outputs from the sensors.

Figure 2:
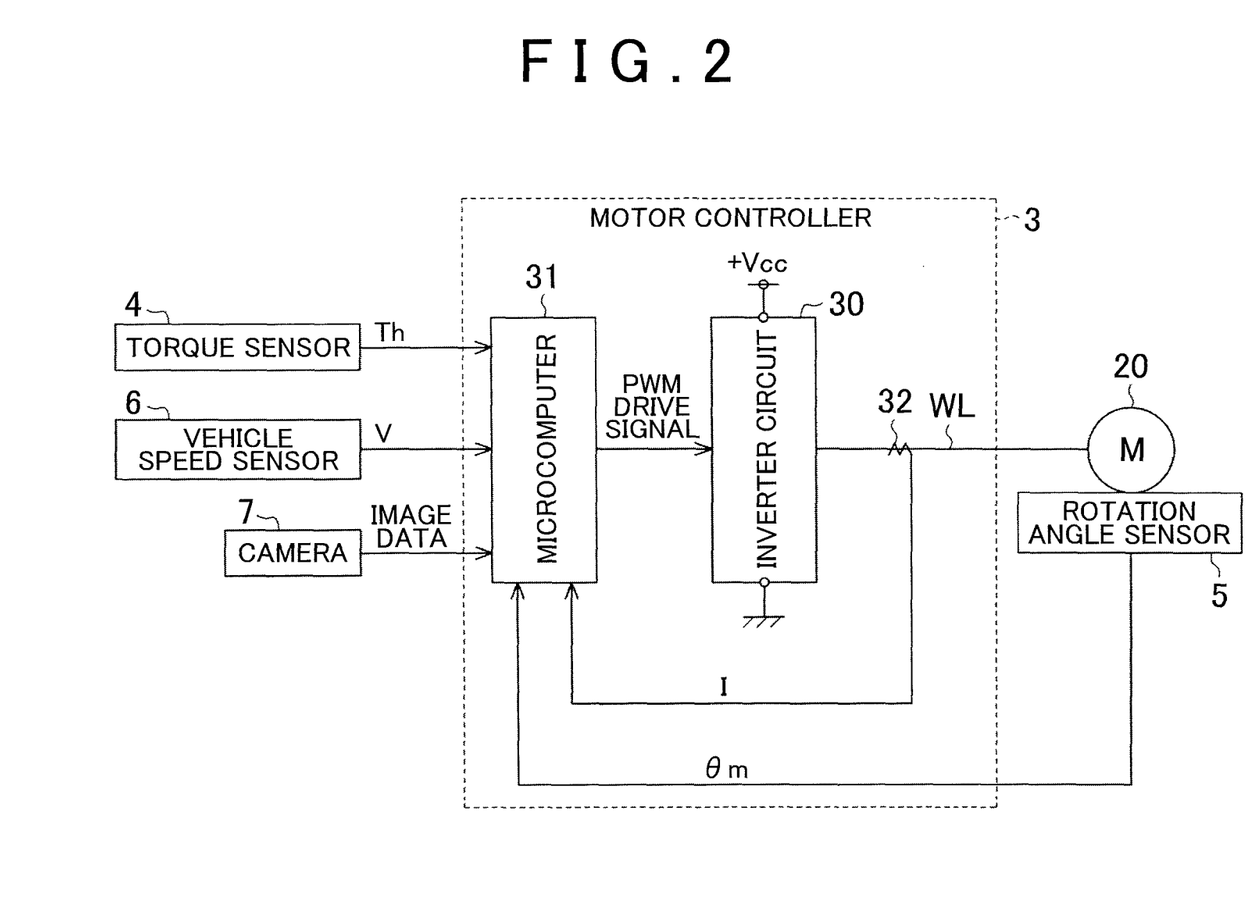
FIG. 2 is a block diagram illustrating the configuration of a motor controller of the vehicle power steering system according to the embodiment.

As illustrated in FIG. 2, the motor controller 3 includes an inverter circuit 30 that converts direct-currents (DC) supplied from a power source such as an in-vehicle battery into alternating-currents (AC) with three phases (U-phase, V-phase, W-phase), and a microcomputer 31 that drives the inverter circuit 30 through pulse width modulation (PWM). The voltage of the power source is denoted by +Vcc.

The inverter circuit 30 converts DC supplied from the power source into three-phase AC on the basis of a PWM drive signal from the microcomputer 31. The three-phase AC is supplied to the electric motor 20 through power supply lines WL.

The power supply lines WL are provided with current sensors 32 that detect values I of the three-phase currents that flow through the power supply lines WL, respectively. The outputs from the current sensors 32 are input into the microcomputer 31. The respective outputs from the torque sensor 4, the rotation angle sensor 5, the vehicle speed sensor 6, and the camera 7 are also input into the microcomputer 31. The microcomputer 31 executes, on the basis of the outputs from these sensors, assist control for assisting a driver's steering operation, and lane keeping control for assisting a driver's steering operation such that the vehicle easily keeps travelling within a lane.

Specifically, the assist control is control in which an assist torque is set on the basis of the steering torque Th, the vehicle speed V, the motor rotation angle θm, and the respective phase current values I detected by the sensors, and the assist torque is applied from the electric motor 20 to the steering shaft 11. The lane keeping control is control in which an ideal steered angle, at which the vehicle is able to keep travelling in a lane, is computed on the basis of image data captured by the camera 7 and an assist torque corresponding to the deviation between the ideal steered angle and the actual steered angle θp of the steered wheels 15 is applied from the electric motor 20 to the steering shaft 11. The microcomputer 31 generates a PWM drive signal on the basis of these controls, and outputs the PWM drive signal to the inverter circuit 30. Thus, the inverter circuit 30 controls the electric motor 20 through PWM control.

Figure 3:
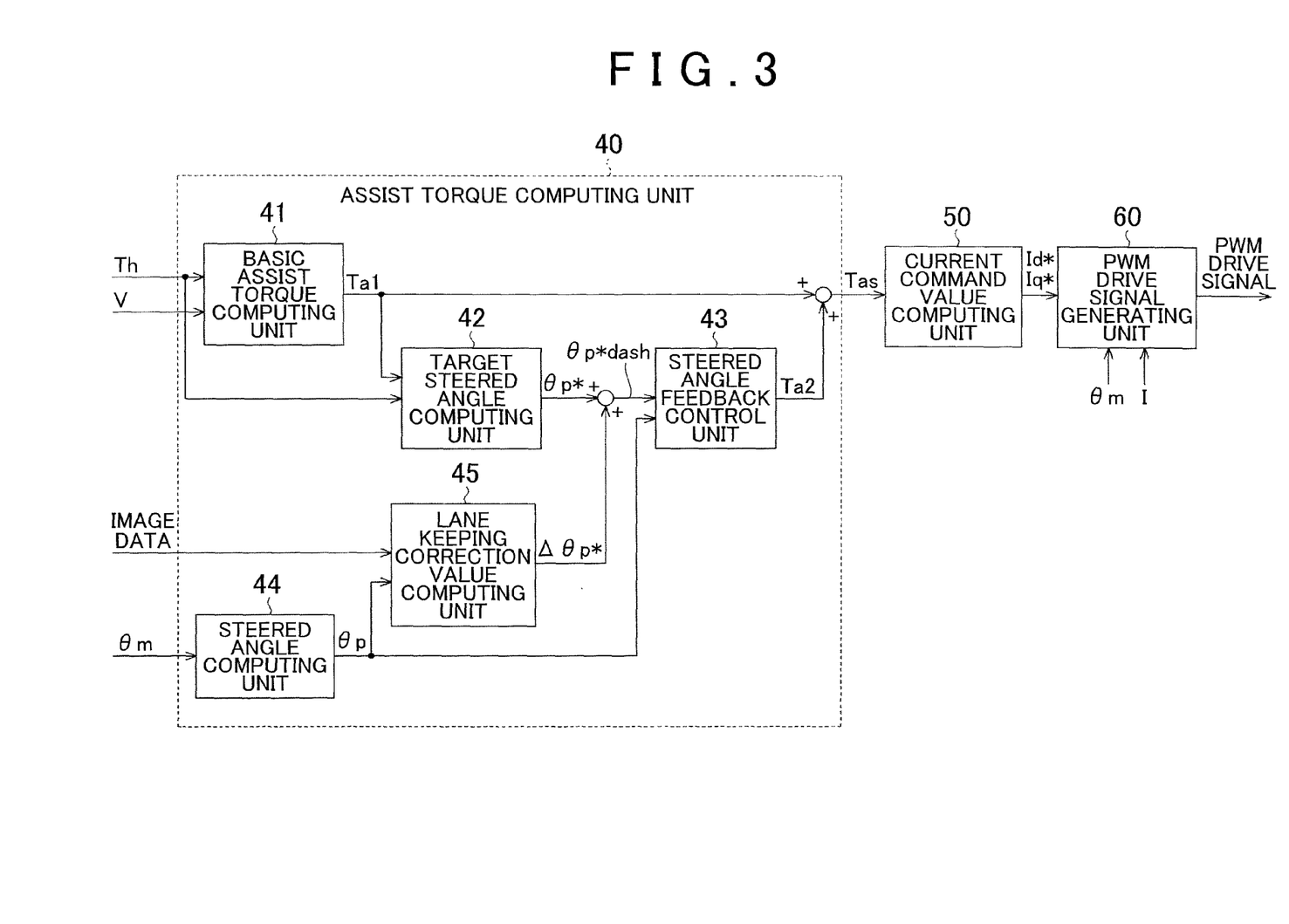
FIG. 3 is a control block diagram illustrating the configuration of control executed by a microcomputer in the motor controller of the vehicle power steering system according to the embodiment.

Next, the drive control executed on the electric motor 20 by the microcomputer 31 will be described in detail with reference to a control block diagram in FIG. 3. In the microcomputer 31, as illustrated in FIG. 3, computations are executed by an assist torque computing unit 40 that computes an assist torque Tas, on the basis of the steering torque Th, the vehicle speed V, the image data captured by the camera 7, and the motor rotation angle θm.

Figure 4:
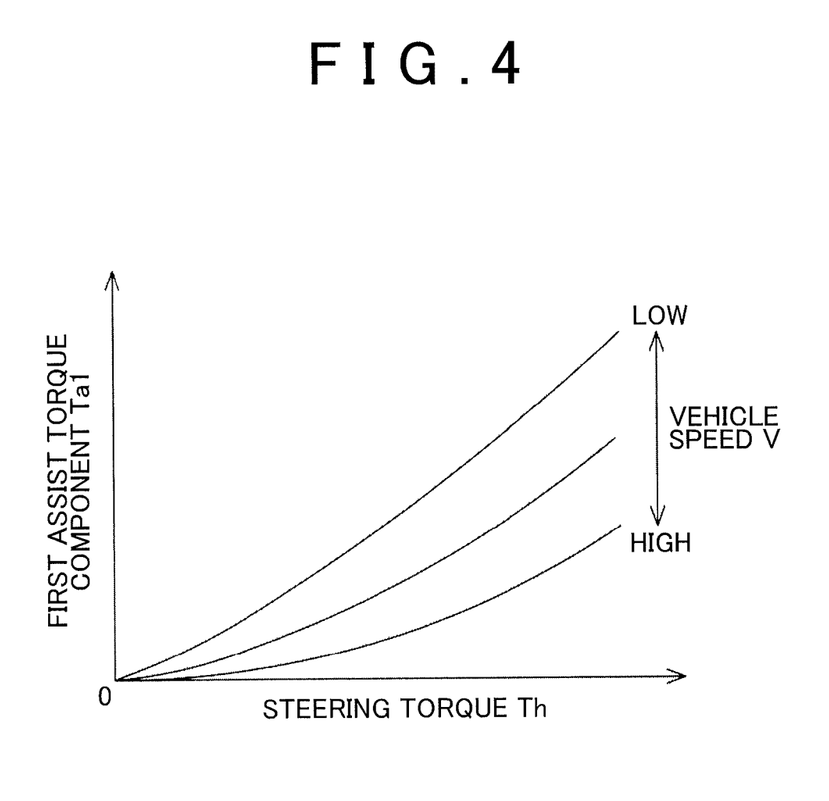
FIG. 4 is a graph illustrating the relationship among the steering torque, the vehicle speed and the first assist torque component.

The assist torque computing unit 40 includes a basic assist torque computing unit (first setting unit) 41 that computes a first assist torque component Ta1 that is a basic component of the assist torque Tas. The basic assist torque computing unit 41 computes the first assist torque component Ta1 on the basis of the steering torque Th and the vehicle speed V. The basic assist torque computing unit 41 computes the first assist torque component Ta1 based on the vehicle speed V and the steering torque Th, for example, with the use of a map as illustrated in FIG. 4. As illustrated in FIG. 4, the basic assist torque computing unit 41 sets the first assist torque component Ta1 to a larger value as the steering torque Th becomes higher. As the vehicle speed V becomes higher, the rate of change in the first assist torque component Ta1 with respect to the steering torque Th (assist change rate) is made lower. As illustrated in FIG. 3, the basic assist torque computing unit 41 outputs the computed first assist torque component Ta1 to a target steered angle computing unit 42.

Information on the steering torque Th in addition to the first assist torque component Ta1 is input into the target steered angle computing unit 42. The target steered angle computing unit 42 has an ideal model that outputs a target steered angle θp* with respect to a drive torque Td when the sum of the first assist torque component Ta1 and the steering torque Th is defined as the drive torque Td. The target steered angle computing unit 42 adds together the first assist torque component Ta1 and the steering torque Th to obtain the drive torque Td, and computes the target steered angle θp* from the drive torque Td on the basis of the ideal model. Next, the ideal model will be described in detail.

In the power steering system according to the present embodiment, the torque that acts on the steered wheels 15 when a driver performs a steering operation is constituted mainly of the drive torque Td that is the sum of the first assist torque component Ta1 and the steering torque Th. Thus, a driver's steering feel is determined based on the manner in which the actual steered angle θp changes based on the drive torque Td. Meanwhile, the driver's steering feel may be classified into feeling components, such as a spring feel, a viscous feel, and an inertia feel. The spring feel depends on, for example, the designs of a suspension and wheel alignment and grip force of the steered wheels 15. The viscous feel depends on, for example, friction in the steering mechanism 1. The inertia feel depends on an inertial motion generated in the steering mechanism 1 when the driver executes a steering operation. Thus, in the present embodiment, the drive torque Td is modeled as the sum of the following terms a1) to a3).

a1) A spring term proportional to the actual steered angle θp.

a2) A viscous term proportional to a first-order temporal differential value θp' of the actual steered angle θp.

a3) An inertia term proportional to a second-order temporal differential value θp'' of the actual steered angle θp.

That is, when a spring coefficient that is a proportional constant of the spring term is K, a viscosity coefficient that is a proportional constant of the viscous term is C, and an inertia coefficient that is a proportional constant of the inertia term is J, the drive torque Td is modeled by Equation (1) indicated below.

$$Td = K \times \theta p + C \times \theta p' + J \times \theta p'' \quad (1)$$

Figure 5:
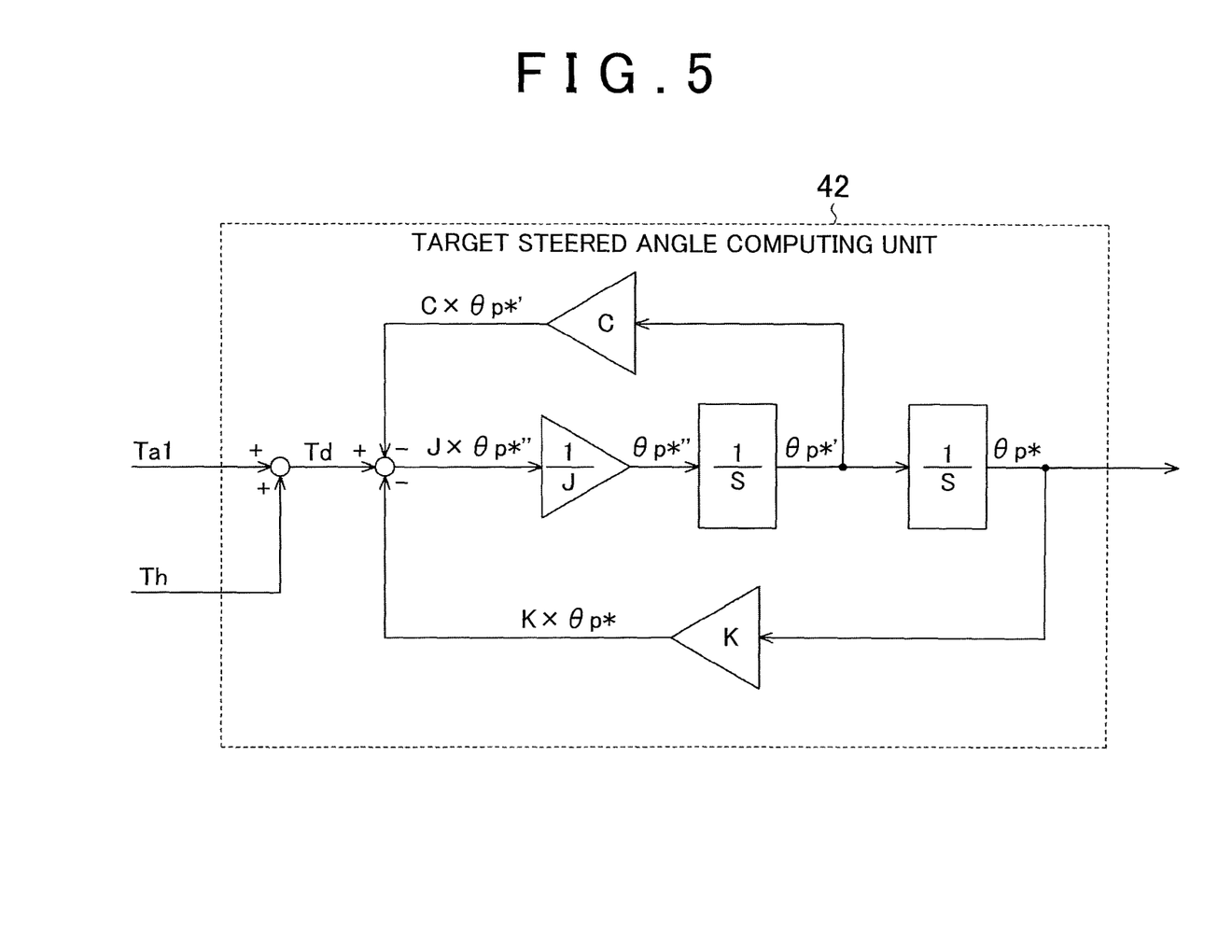
FIG. 5 is a control block diagram illustrating the configuration of a target steered angle computing unit in the vehicle power steering system according to the embodiment.

The target steered angle computing unit 42 computes the target steered angle θp* from the drive torque Td, according to Equation (1). Specifically, as illustrated in FIG. 5, first, the target steered angle computing unit 42 adds together the first assist torque component Ta1 and the steering torque Th to calculate the drive torque Td. Then, the inertia term J×θp*'' is calculated by subtracting the spring term K×θp* and the viscous term C×θp*' from the drive torque Td. Then, the second-order temporal differential value θp*'' is calculated by dividing the inertia term J×θp*''38 by the inertia coefficient J, and the first-order temporal differential value θp*' is calculated by integrating the second-order temporal differential value θp*''. The target steered angle θp* is calculated by further integrating the first-order temporal differential value θp*'. The calculated first-order temporal differential value θp*' and the calculated target steered angle θp* are used in the computation for subtracting the spring term and the viscous term from the drive torque Td.

Meanwhile, as illustrated in FIG. 1, because the electric motor 20 is connected to the steering shaft 11 via the reduction gear 21, there is a correlation between the motor rotation angle θm and the rotation angle of the steering shaft 11. That is, there is also a correlation between the motor rotation angle θm and the actual steered angle θp of the steered wheels 15. As illustrated in FIG. 3, the assist torque computing unit 40 includes a steered angle computing unit 44 that computes the actual steered angle θp of the steered wheels 15 from the motor rotation angle θm, based on the correlation. The steered angle computing unit 44 outputs the computed actual steered angle θp to a lane keeping correction value computing unit 45 and a steered angle feedback control unit 43.

Figure 6:
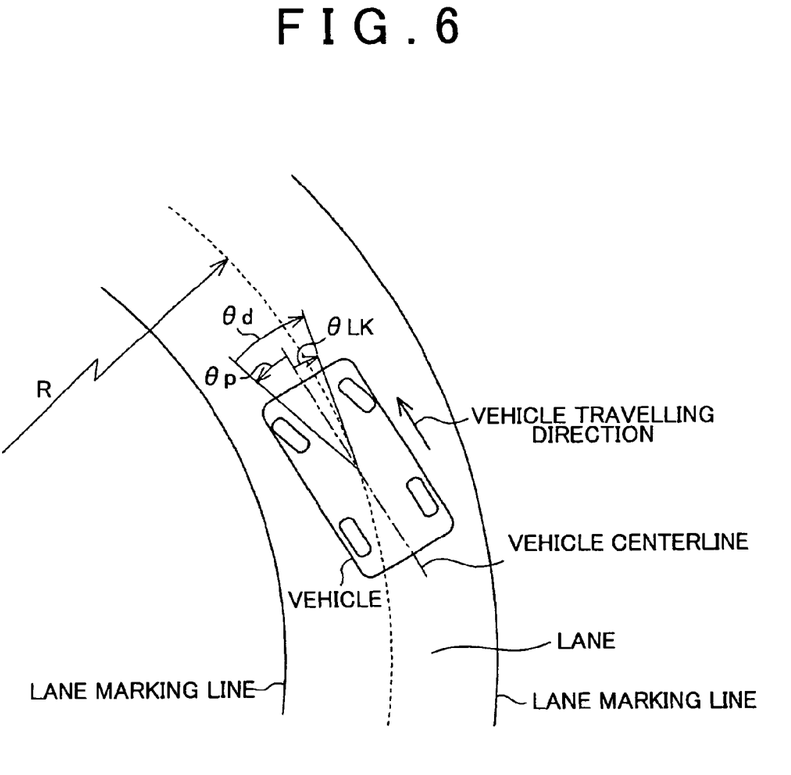
FIG. 6 is a view schematically illustrating an example of computation of a deviation between the ideal steered angle and the actual steered angle in the vehicle power steering system according to the embodiment.

The image data of the area ahead of the vehicle captured by the camera 7 in addition to the actual steered angle θp is input into the lane keeping correction value computing unit 45. The lane keeping correction value computing unit 45 executes image processing, such as image thresholding, on the image data received from the camera 7 to detect information on lane marking lines printed on a road ahead of the vehicle. As described above, in the present embodiment, the camera 7 serves as a lane detecting unit. As illustrated in FIG. 6, the lane keeping correction value computing unit 45 calculates a curvature R of the road ahead of the vehicle on the basis of the detected information on the lane. A broken line in FIG. 6 represents a curved line according to the road curvature R, and alternate long and short dash line represents a vehicle center line. The lane keeping correction value computing unit 45 sets an ideal steered angle θLK at which the vehicle is able to keep travelling within a lane, on the basis of the calculated road curvature R, and computes a correction value Δθp*, on the basis of a deviation θd between the ideal steered angle θLK and the actual steered angle θp.

As illustrated in FIG. 3, the assist torque computing unit 40 corrects the target steered angle θp* computed by the target steered angle computing unit 42, based on the correction value Δθp* computed by the lane keeping correction value computing unit 45, and inputs a corrected target steered angle θp*dash (=θp*+Δθp*) to the steered angle feedback control unit 43.

The steered angle feedback control unit 43 executes steered angle feedback control in order to make the actual steered angle θp coincide with the corrected target steered angle θp*dash. In the steered angle feedback control, a second assist torque component Ta2 is set on the basis of the deviation between the actual steered angle θp and the corrected target steered angle θp*dash.

The assist torque computing unit 40 adds together the first assist torque component Ta1 computed by the basic assist torque computing unit 41 and the second assist torque component Ta2 computed by the steered angle feedback control unit 43 to calculate the assist torque Tas, and outputs the assist torque Tas to a current command value computing unit 50.

The current command value computing unit 50 computes a current command value Iq* on a q-axis in a d/q coordinate system on the basis of the assist torque Tas, and outputs the current command value Iq* to a PWM drive signal generating unit 60. In the present embodiment, a current command value Id* on a d-axis is zero, and the current command value computing unit 50 also outputs the current command value Id* to the PWM drive signal generating unit 60.

Information on the phase current values I and the motor rotation angle θm in addition to the current command values Id*, Iq* from the current command value computing unit 50 are also input into the PWM drive signal generating unit 60. The PWM drive signal generating unit 60 converts the phase current values I into a d-axis current value and a q-axis current value of the d/q coordinate system, using the motor rotation angle θm. The PWM drive signal generating unit 60 executes feedback control based on the deviations between the d-axis, q-axis current values and the current command values Id*, Iq* such that the d-axis current value coincides with the current command value Id* and the q-axis current value coincides with the current command value Iq*, and generates a PWM drive signal. Thus, the inverter circuit 30 is driven through PWM, and the assist torque Tas is applied from the electric motor 20 to the steering shaft 11.

With the configuration as described above, the actual steered angle θp is maintained at the target steered angle θp* by applying the assist torque Tas containing the second assist torque component Ta2 to the steering mechanism 1. Thus, it is possible to reliably suppress vibrations of the steering mechanism 1 due to disturbance. The spring feel, the viscous feel, and the inertia feel that a driver feels when the driver performs a steering operation are changed as needed by appropriately adjusting values of the spring coefficient K, the viscosity coefficient C, and the inertia coefficient J in the target steered angle computing unit 42 illustrated in FIG. 5. That is, a desired steering feel is obtained.

Next, the operation of the present embodiment will be described. The following description will be provided on the assumption that the deviation θd arises between the ideal steered angle θLK set on the basis of the road curvature R, and the actual steered angle θp as illustrated in FIG. 6. In this case, as described above, the lane keeping correction value computing unit 45 computes the correction value Δθp* on the basis of the deviation θd, and corrects the target steered angle θp* based on the correction value Δθp*, as illustrated in FIG. 3. Thus, when the steered angle feedback control unit 43 computes the second assist torque component Ta2 on the basis of the corrected target steered angle θp*dash and the actual steered angle θp, an assist torque component corresponding to the correction value Δθp* is contained in the second assist torque component Ta2. That is, the assist torque component that brings the actual steered angle θp closer to the ideal steered angle θLK is contained in the second assist torque component Ta2. Hence, the driver's steering operation is assisted so that the actual steered angle θp is brought closer to the ideal steered angle θLK, by applying the assist torque Tas containing the second assist torque component Ta2 to the steering shaft 11. Thus, the lane keeping control is realized. As a result, it is possible to ensure the stability of the vehicle travel.

Due to the configuration in which the target steered angle θp* is corrected by the correction value Δθp*, the target steered angle θp* is offset just by the correction value Δθp*, and it is thus possible to maintain the control in which the ideal target steered angle θp* corresponding to the steering torque is calculated on the basis of the ideal model and the actual steered angle θp is brought closer to the target steered angle θp*. Thus, desired properties are imparted to the steering feel obtained by applying the assist torque Tas containing the second assist torque component Ta2 to the steering shaft 11, that is, the steering feel obtained by the assist control. Hence, the driver's steering feel is improved.

With the vehicle power steering system according to the present embodiment, the following advantageous effects are obtained.

1) In the assist torque computing unit 40, the ideal steered angle θLK at which the vehicle is able to keep travelling within a lane is set, and the correction value Δθp* is computed on the basis of the deviation θd between the ideal steered angle θLK and the actual steered angle θp. Then, the target steered angle θp* is corrected by the correction value Δθp*. Thus, desired properties are imparted to the steering feel obtained by the assist control. As a result, the driver's steering feel is improved. Because the driver's steering operation is assisted such that the vehicle easily keeps travelling within a lane, the stability of the vehicle travel is ensured.

2) In the assist torque computing unit 40, the target steered angle θp* used for computation of the second assist torque component Ta2 is corrected by the correction value Δθp*. Thus, it is possible to suppress an increase in the computation load caused by the correction of the target steered angle θp*.

The invention may be implemented in the following embodiments formulated by modifying the first embodiment. In the first embodiment, in order to realize the lane keeping control, the correction value Δθp* is computed on the basis of the deviation θd between the ideal steered angle θLK at which the vehicle is able to keep travelling within a lane, and the actual steered angle θp. However, the method of computing the correction value Δθp* may be changed as needed. For example, in another embodiment, an ideal yaw rate of the vehicle may be calculated from the ideal steered angle θLK, and the correction value Δθp* may be computed on the basis of the deviation between an actual yaw rate of the vehicle detected by a sensor, and the ideal yaw rate. The lane keeping control is realized by this method.

Figure 7:
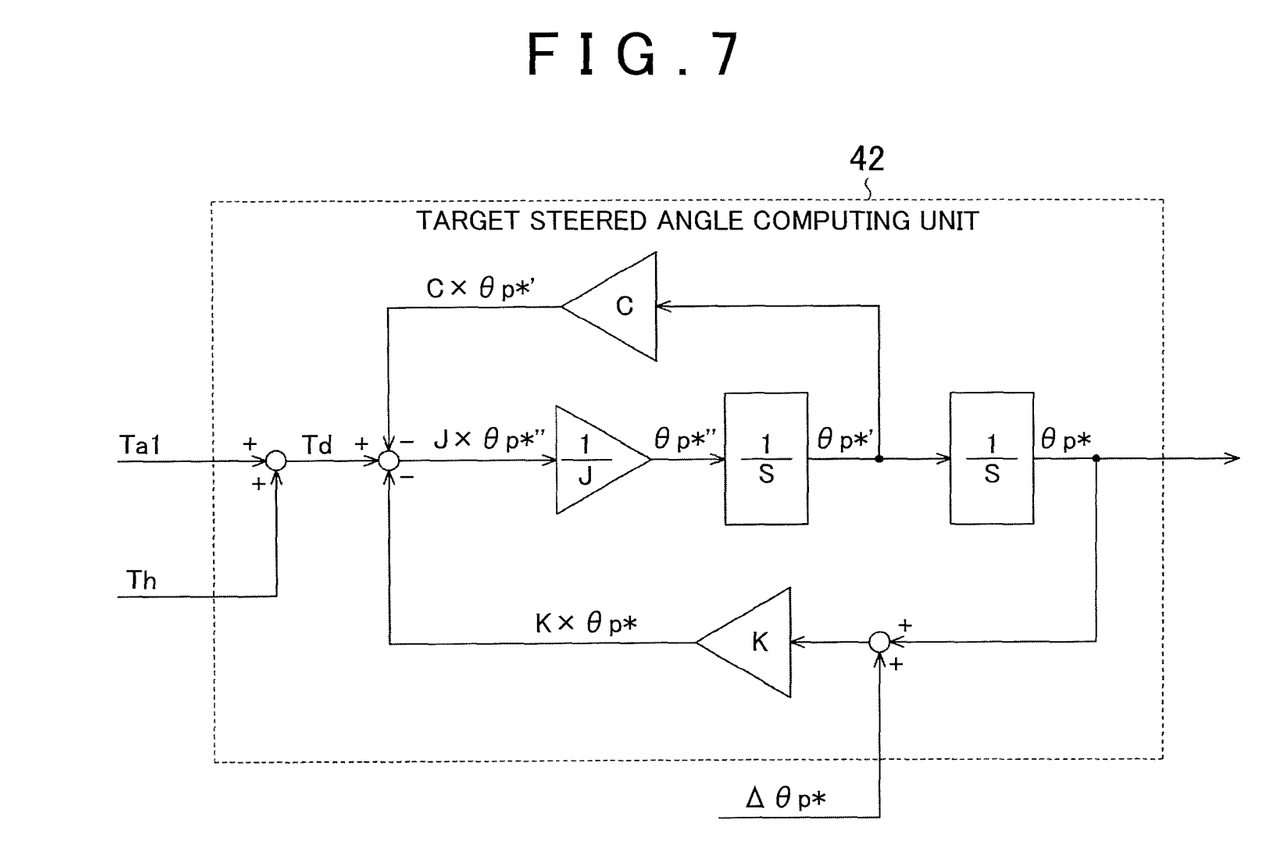
FIG. 7 is a control block diagram illustrating the configuration of a target steered angle computing unit in a vehicle power steering system according to another embodiment of the invention.

In the first embodiment, the target steered angle Δθp* used for computation of the second assist torque component Ta2 is corrected by the correction value Δθp*. However, in another embodiment, as illustrated in FIG. 7, the target steered angle θp* used for computation of the spring term in the target steered angle computing unit 42 may be corrected by the correction value Δθp*. That is, the target steered angle Δθp* of the ideal model may be corrected by the correction value Δθp*. In such a configuration as well, it is possible to correct the target steered angle θp* while suppressing an increase in the computation load.

In the first embodiment, the model illustrated to FIG. 5 is used as the ideal model of the target steered angle computing unit 42. However, the ideal model may be changed as needed. In another embodiment, an ideal model from which the inertia feel is omitted, an ideal model to which the friction feel is newly added, or the like may be used. An ideal model that sets the target steered angle θp* on the basis of only the steering torque Th may be used.

The target steered angle computing unit 42 is not limited to a computing unit that computes the target steered angle Δθp* with the use of the ideal model. In another embodiment, the target steered angle θp* may be computed based on a map as in the basic assist torque computing unit 41.

In the first embodiment, the lane keeping control is executed. Instead of this, intelligent parking control for assisting a steering operation during parking may be executed in another embodiment. Further, both the lane keeping control and the intelligent parking control may be executed. That is, the assist torque computing unit needs to be configured such that the ideal steered angle is set on the basis of the travelling state of the vehicle, the correction value is set on the basis of the deviation between the ideal steered angle and the actual steered angle, and the target steered angle is corrected by the correction value.

In the basic assist torque computing unit 41 in the first embodiment, the first assist torque component Ta1 is set on the basis of the steering torque Th and the vehicle speed V. However, in another embodiment, the first assist torque component Ta1 may be set on the basis of only the steering torque Th. There may be executed so-called phase compensation control of changing the phase of the steering torque Th, which is detected by the torque sensor 4, on the basis of the rate of change in the first assist torque component Ta1 with respect to the steering torque Th (assist change rate). There may be executed so-called torque differential control in which the first assist torque component Ta1 is made larger as the first differential value of the assist torque component Ta1 becomes larger.

In the first embodiment, the invention is applied to the power steering system that applies the assist torque to the steering shaft 11. However, the invention may be applied to a power steering system that applies the assist torque to the rack shaft 13.

What is claimed is:

1. A vehicle power steering system comprising an assist torque computing unit configured to:
   i) set a first assist torque component based on a steering torque applied to a steering mechanism during a steering operation of a vehicle;
   ii) compute a target steered angle of steered wheels of the vehicle based on the steering torque;
   iii) set a second assist torque component to be applied to the steering mechanism to maintain an actual steered angle of the steered wheels at the target steered angle;
   iv) set an assist torque corresponding to the first assist torque component and the second assist torque component;
   v) set an ideal steered angle based on a travelling state of the vehicle;
   vi) compute a correction value based on a deviation between the ideal steered angle and the actual steered angle; and
   vii) correct the target steered angle based on the correction value,
   the vehicle power steering system assisting the steering operation by applying the assist torque from an electric motor to the steering mechanism.

2. A vehicle power steering system comprising an assist torque computing unit configured to:
   i) set a first assist torque component based on a steering torque applied to a steering mechanism during a steering operation of a vehicle;
   ii) compute a target steered angle of steered wheels of the vehicle based on the steering torque;
   iii) set a second assist torque component to be applied to the steering mechanism to maintain an actual steered angle of the steered wheels at the target steered angle;
   iv) set an assist torque corresponding to the first assist torque component and the second assist torque component;
   v) set an ideal steered angle based on a travelling state of the vehicle;
   vi) compute a correction value based on a deviation between the ideal steered angle and the actual steered angle; and
   vii) correct the target steered angle based on the correction value,
   the vehicle power steering system assisting the steering operation by applying the assist torque from an electric motor to the steering mechanism,
   wherein:
   a corrected target steered angle is generated by correcting the target steered angle based on the correction value; and
   the corrected target steered angle is used for computation of the second assist torque component.

3. A vehicle power steering system comprising an assist torque computing unit configured to:
   i) set a first assist torque component based on a steering torque applied to a steering mechanism during a steering operation of a vehicle;
   ii) compute a target steered angle of steered wheels of the vehicle based on the steering torque;
   iii) set a second assist torque component to be applied to the steering mechanism to maintain an actual steered angle of the steered wheels at the target steered angle;
   iv) set an assist torque corresponding to the first assist torque component and the second assist torque component;
   v) set an ideal steered angle based on a travelling state of the vehicle;
   vi) compute a correction value based on a deviation between the ideal steered angle and the actual steered angle; and
   vii) correct the target steered angle based on the correction value,
   the vehicle power steering system assisting the steering operation by applying the assist torque from an electric motor to the steering mechanism,
   wherein:
   a drive torque is calculated by addition together the steering torque and the first assist torque component;
   the target steered angle is set from the drive torque based on an ideal model that outputs an ideal target steered angle with respect to the drive torque; and
   the target steered angle is corrected by adding the correction value to the target steered angle.

4. The vehicle power steering system according to claim 1, further comprising a lane detecting unit that detects lane marking lines printed on a road ahead of the vehicle, wherein the ideal steered angle based on the travelling state of the vehicle is set by computing a steered angle at which the vehicle is able to keep travelling within the lane, based on information on the lane detected by the lane detecting unit.

5. The vehicle power steering system according to claim 2, further comprising a lane detecting unit that detects lane marking lines printed on a road ahead of the vehicle, wherein the ideal steered angle based on the travelling state of the vehicle is set by computing a steered angle at which the vehicle is able to keep travelling within the lane, based on information on the lane detected by the lane detecting unit.

6. The vehicle power steering system according to claim 3, further comprising a lane detecting unit that detects lane marking lines printed on a road ahead of the vehicle, wherein the ideal steered angle based on the travelling state of the vehicle is set by computing a steered angle at which the vehicle is able to keep travelling within the lane, based on information on the lane detected by the lane detecting unit.

7. The vehicle power steering system according to claim 1, wherein:
   a drive torque is calculated by adding together the steering torque and the first assist torque component;
   the target steered angle is set from the drive torque based on an ideal model that outputs an ideal target steered angle with respect to the drive torque; and
   a sum of the target steered angle and the correction value is used for calculation of the target steered angle in the ideal model.

8. The vehicle power steering system according to claim 1, wherein the assist torque computing unit is further configured to:
   for step (i), set the first assist torque component based on vehicle speed.

9. The vehicle power steering system according to claim 8, wherein the assist torque computing unit is further configured to:
   for step (ii), calculate a drive torque by adding together the steering torque and the first assist torque component;
   wherein the relation between the target steered angle and the drive torque is modeled by an equation that adds terms comprising a spring term, a viscous term and an inertia term.

* * * * *